Jan. 11, 1955
R. L. BRUNSING
2,699,048
METHOD OF COOLING LEAF VEGETABLES
Filed Feb. 14, 1950
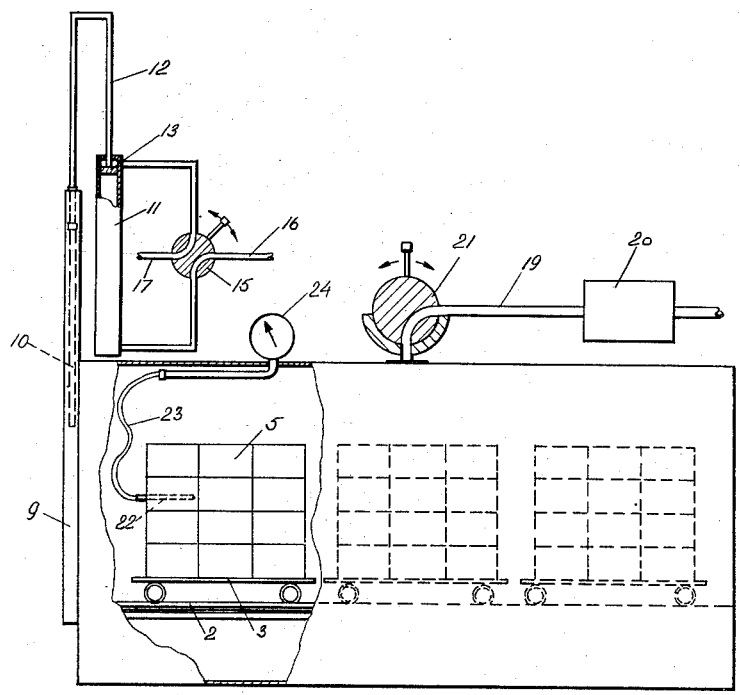
Fig. 1
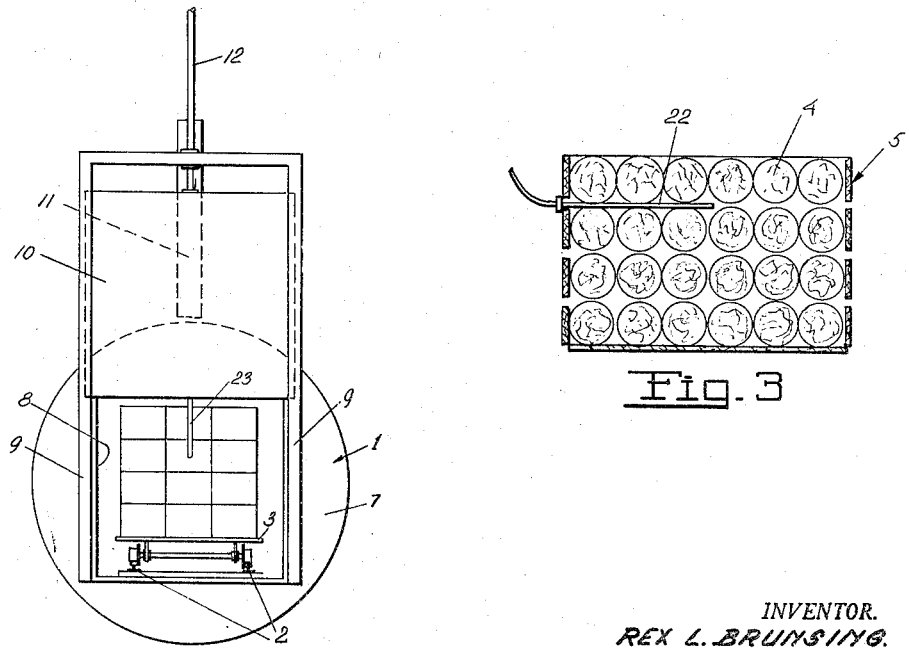
Fig. 2
Fig. 3
INVENTOR.
REX L. BRUNSING.
BY
Boyken, Mohler & Berkley
ATTORNEYS.

United States Patent Office 2,699,048
Patented Jan. 11, 1955

2,699,048

METHOD OF COOLING LEAF VEGETABLES

Rex L. Brunsing, San Francisco, Calif., assignor to Vacuum Cooling Company, San Francisco, Calif., a corporation of Nevada Application February 14, 1950, Serial No. 144,185

3 Claims. (Cl. 62—178)

This invention generally relates to the precooling of leaf vegetables prior to shipment or storage thereof. The principle followed in such precooling, is that of evaporating the free surface moisture that is on the leaves or in the hands of such vegetables. Lettuce and spinach are two examples of the vegetables that may be so cooled. Lettuce of the varieties that form relatively tight and hard heads have heretofore been particularly difficult to cool satisfactorily by evaporation of moisture within the heads, and the present invention is particularly adapted to cooling such heads.

One of the objects of the present invention is the method of uniformly cooling leaf vegetables, particularly of the type formed into heads, without injury to the heads.

Another object of the invention is the provision of an improved method of uniformly cooling a body of packed leaf vegetables throughout without injury to the vegetables.

A still further object of the invention is the provision of apparatus suitable for use in the present method of cooling leaf vegetables.

In the precooling of leaf vegetables, particularly lettuce of the type in which the leaves from relatively light hard heads, it has heretofore been found impossible to precool such heads throughout, consistently, to the desired degree of substantially 34° F. without freezing the outer leaves. The general principle of vacuum cooling has been known for a considerable time, but heretofore has not met with success in the precooling of vegetables that would be injured by freezing.

In this connection it should be pointed out that, in order to have practical utility, the cooling of lettuce and other leaf vegetables must be rapid. The lettuce, when harvested in the field, will be at substantially atmospheric temperatures, which may be from about 60° F. to 90° F. This so called "field heat" should be removed as quickly as possible after the lettuce is packed in crates in the field, and heretofore the practice has been to put ice between the layers, resulting in bruising the lettuce, and in creating a wet undesirable condition through the melting of the ice that in itself causes deterioration of the lettuce. Furthermore, the heads of lettuce are not uniformly reduced to substantially 32° F. throughout the heads and the pack.

Vacuum cooling, or the cooling by evaporation of free moisture in the heads is readily accomplished, but has heretofore been quite hazardous because of the danger of freezing the outer leaves (resulting in an unmarketable product) when a uniform temperature as low as 32° F. throughout the heads has been attempted. Attempts have been made to control the cooling by shutting off the suction to the vacuum chamber containing the lettuce when the temperature of the water vapors over the body of lettuce reached about substantially 32° F., but this temperature did not reflect the true temperature of the interior of the heads nor even the temperature of the outer surfaces of the heads. The obvious solution for this difficulty appeared to be in thrusting a thermometer into the heart of a head of lettuce, or in thrusting thermometers into the hearts of several heads, but this resulted in failure due to lack of uniformity of the head structures, as well as head sizes and the different locations of different heads. Some batches would be partially frozen while others would not be cooled to the desired degree.

The present invention has overcome the above difficulties and half carloads lots (capacity of present equipment) have been consistently precooled throughout to 32° F. without freezing the lettuce and at the rate of ten minutes per lot (exclusive of loading and unloading time) where the initial temperature of the lettuce is 70° F., or 12 minutes when 80° F. This result has been accomplished by the apparatus and method hereinafter described more in detail.

In the drawings, Fig. 1 is a semi-digrammatic side view of a vacuum drum in which the lettuce is cooled, one end being broken away to show the positioning of the thermometer.

Fig. 2 is an end view of the drum as seen from the open end with the end closure in open position.

Fig. 3 is an enlarged sectional view taken through a crate of lettuce showing the thermometer in position in the crate.

In detail, the apparatus illustrated in Figs. 1, 2 comprises a stationary cylindrical, horizontally disposed drum 1 that has a track 2 therein extending longitudinally thereof for supporting the wheels of trucks or carts 3 for movement longitudinally of the drum. The heads 4 (Fig. 3) of lettuce are packed in crates 5 which crates, in turn are loaded onto the trucks 3 for movement into and out of the drum 1.

The drum is closed at one end and the opposite end is provided with a head 7 (Fig. 2) having a rectangular opening 8 therein through which the loaded trucks 3 may be moved into and out of the drum. Conventional vertical guideways 9 along opposite vertical edges of the opening 8 support a door 10 for vertical movement from a lowered position in hermetically sealing the opening 8 against ingress of air therethrough past said door to an upper open position (Fig. 2) in which the truck may pass into and out of the drum through opening 8.

Any suitable means may be provided for raising and for lowering said door such as a pneumatic or hydraulic cylinder 11 secured to the end of said drum having a piston, 13 (not shown) reciprocable therein under the influence of fluid water pressure above or below the same, which piston is connected by a connection 12 with the door. This is conventional structure, in which the fluid is pumped under pressure into the cylinder below the piston while fluid above the piston is released for discharge from the cylinder for elevating the door. Any suitable control valve 15 (Fig. 1) alternately connecting the ends of the cylinder 11 with a fluid pressure line 16 and a drain line 16 may control the opening and closing of the door 10 as desired.

A suction line 19 may connect the cylinder with a conventional steam jet evacuator 20 for evacuating the cylinder when door 10 is closed until a pressure of only about one inch of mercury is within the cylinder 1.

A conventional valve 21 in any suitable structure in pipe 19 is adapted to open and close pipe 19 to the influence of the evacuator 20 and to open the cylinder to atmospheric pressure, as desired.

An evacuating system such as indicated in copending application Serial No. 105,302, filed July 18, 1949, by Beardsly and Brunsing, now Patent No. 2,621,492, would be suitable for evacuating the cylinder 1, or any other several stage vacuum pump is suitable.

Valves 15, 21 merely indicate controls that may be mechanically or manually actuated, inasmuch as the present invention is not concerned with the specific mechanical structure employed.

A conventional fluid pressure thermometer 22 is provided within the cylinder 1, and this thermometer is connected by a flexible pipe or tube 23 within said cylinder with a Bourdon gauge 24 or the like that may be mounted on the cylinder 1 outside the same or at any other suitable location for reading. The cylinder wall is preferably provided with an opening for providing a coupling between the Bourdon gauge and the thermometer that is sealed with the cylinder against leakage. The important feature is that the thermometer be capable of being thrust between adjacent layers of lettuce in the crate 5, or below the upper surface of leaf vegetables, such as spinach, that may be in the crates.

Fig. 3 illustrates the position of the thermometer.

For convenience, the thermometer should be at the end of the cylinder adjacent the closure gate 10, inasmuch as the operator may thrust the thermometer between said layers of lettuce just before closing the gate, or door 10, however, the flexibility of tube 23 is adequate to enable the operator to insert the tube between whatever layers are most convenient.

The steps of the method practiced in the cooling of the lettuce, the latter being of the headed variety in which the leaves are tightly packed to form relatively hard heads, is as follows:

First the loaded crates of lettuce at atmospheric temperature are placed in the cylinder. The gate 10 is then closed, and the thermometer 24 will indicate the temperature of the air to be at say 75° F., for example.

The valve 21 is then opened to effect withdrawal of the air and vapor of evaporation from the cylinder at a rate that will effect evaporation of the surface moisture within the heads of lettuce sufficiently fast to cause a rapid drop in the temperature within said cylinder and in the heads of lettuce. A quick reduction of the pressure within said cylinder to about one inch of mercury will effect a drop in the temperature within the lettuce head of about 5° F. per minute, or a reduction from the said 75° F. to 35° F. in about 8 to 10 minutes' time.

However, it is of greatest importance in the present instance that the temperature decrease be the decrease that occurs between the heads of lettuce, and not somewhere within the vapor of evaporation or within a head of lettuce itself.

As soon as the thermometer indicates that a temperature of 35° F. has been reached, the valve 21 is quickly closed. The gate or door 10 remains closed and no air is admitted into the cylinder. Due to the partial vacuum maintained within the cylinder the drop in temperature will continue, but at a much slower rate of only one degree per minute, since the moist cold air is no longer being withdrawn from the cylinder.

As soon as the thermometer indicates that a temperature of 32° F. is between the heads of lettuce, the valve 21 may be manipulated to admit atmospheric air into the cylinder and the door 10 is opened, thereby stopping further evaporation and cooling of the lettuce.

By the above method, it will be found that the heads of lettuce throughout the load in the cylinder are respectively substantially at the temperature of 32° F. to the center of each head, and that no freezing whatsoever has occurred. These results are essential to the practical commercially satisfactory precooling of lettuce by the so-called vacuum process.

I claim:

1. The method of cooling a packed body of leaf vegetables having free surface moisture that comprises subjecting said vegetables to a constant relatively high partial vacuum within an enclosed space until the temperature between adjacent leaves within said body resulting from vaporization of said moisture is within several degrees above 32° F., then closing said space against withdrawal of further air and moisture therefrom and excluding admission of air into said space until the said temperature is substantially 32° F. and above the freezing point of said moisture, then admitting atmospheric air at atmospheric temperature into said space until atmospheric pressure is reached and finally removing said vegetables from said space.

2. The method of cooling layers of packed heads of lettuce containing natural free surface moisture and field heat that comprises subjecting said heads to a constant relatively high partial vacuum within an enclosed chamber until the temperature between adjacent heads and below the uppermost layer resulting from evaporation of said moisture in substantially 35° F., then closing said space against withdrawal of air and moisture of evaporation therefrom and excluding admission of air into said space until the said temperature between said adjacent heads and below said uppermost layer is substantially 32° F. and above the freezing point of said moisture, then admitting air at atmospheric temperature into said space until atmospheric pressure is reached, and finally withdrawing said lettuce from said space.

3. The method of handling and processing heads of lettuce containing free surface moisture therein that comprises the steps of, packing said heads close together at field heat temperature, then conveying said packed heads into an enclosed space and lowering the temperature within said space and between said heads at the rate of substantially 5° F. per minute until the said temperature is substantially 35° F. by subjecting said heads to a vacuum of substantially 29 inches of mercury thereby effecting evaporation of said moisture, then closing said space against withdrawal and admission of air thereto and withdrawal of air and moisture vapor therefrom for a period of substantially 3 minutes and until said temperature is substantially 32° F., whereby the temperature at the hearts of said heads will be substantially equal to the said temperature between said heads.

References Cited in the file of this patent

UNITED STATES PATENTS

| 1,062,184 | Palen | May 20, 1913 |
| 1,404,400 | Moon | Jan. 24, 1922 |
| 2,304,192 | Newton | Dec. 8, 1942 |
| 2,422,557 | Kobiolke | June 17, 1947 |

FOREIGN PATENTS

| 389,535 | Great Britain | Mar. 23, 1933 |